No. 695,275. Patented Mar. 11, 1902.
J. BRAKELEY.
MACHINE FOR REMOVING INSECT PARASITES FROM VINES OR PLANTS.
(Application filed Dec. 10, 1900.)
(No Model.) 3 Sheets—Sheet 1.

Witnesses:
Louis M. F. Whitehead
Norman E. _____

Inventor:
Joseph Brakeley
by his Attorneys
Howson & Howson

No. 695,275. Patented Mar. 11, 1902.
J. BRAKELEY.
MACHINE FOR REMOVING INSECT PARASITES FROM VINES OR PLANTS.
(Application filed Dec. 10, 1900.)
(No Model.) 3 Sheets—Sheet 2.

No. 695,275. Patented Mar. 11, 1902.
J. BRAKELEY.
MACHINE FOR REMOVING INSECT PARASITES FROM VINES OR PLANTS.
(Application filed Dec. 10, 1900.)
(No Model.) 3 Sheets—Sheet 3.

Witnesses:—

Inventor:—
Joseph Brakeley
by his Attorneys:—

UNITED STATES PATENT OFFICE.

JOSEPH BRAKELEY, OF FREEHOLD, NEW JERSEY.

MACHINE FOR REMOVING INSECT PARASITES FROM VINES OR PLANTS.

SPECIFICATION forming part of Letters Patent No. 695,275, dated March 11, 1902.

Application filed December 10, 1900. Serial No. 39,393. (No model.)

*To all whom it may concern:*

Be it known that I, JOSEPH BRAKELEY, a citizen of the United States, residing in Freehold, New Jersey, have invented certain Improvements in Machines for Removing Insect Parasites from Vines or Plants, of which the following is a specification.

The object of my invention is to provide means for removing parasites or insects injurious to vegetation from growing vines, plants, or bushes and to kill said parasites by burying them in the earth as soon as they have been removed from the vines or plants or before they have had a chance to crawl back again. This object I attain in the manner hereinafter set forth, reference being had to the accompanying drawings, in which—

Figure 1:
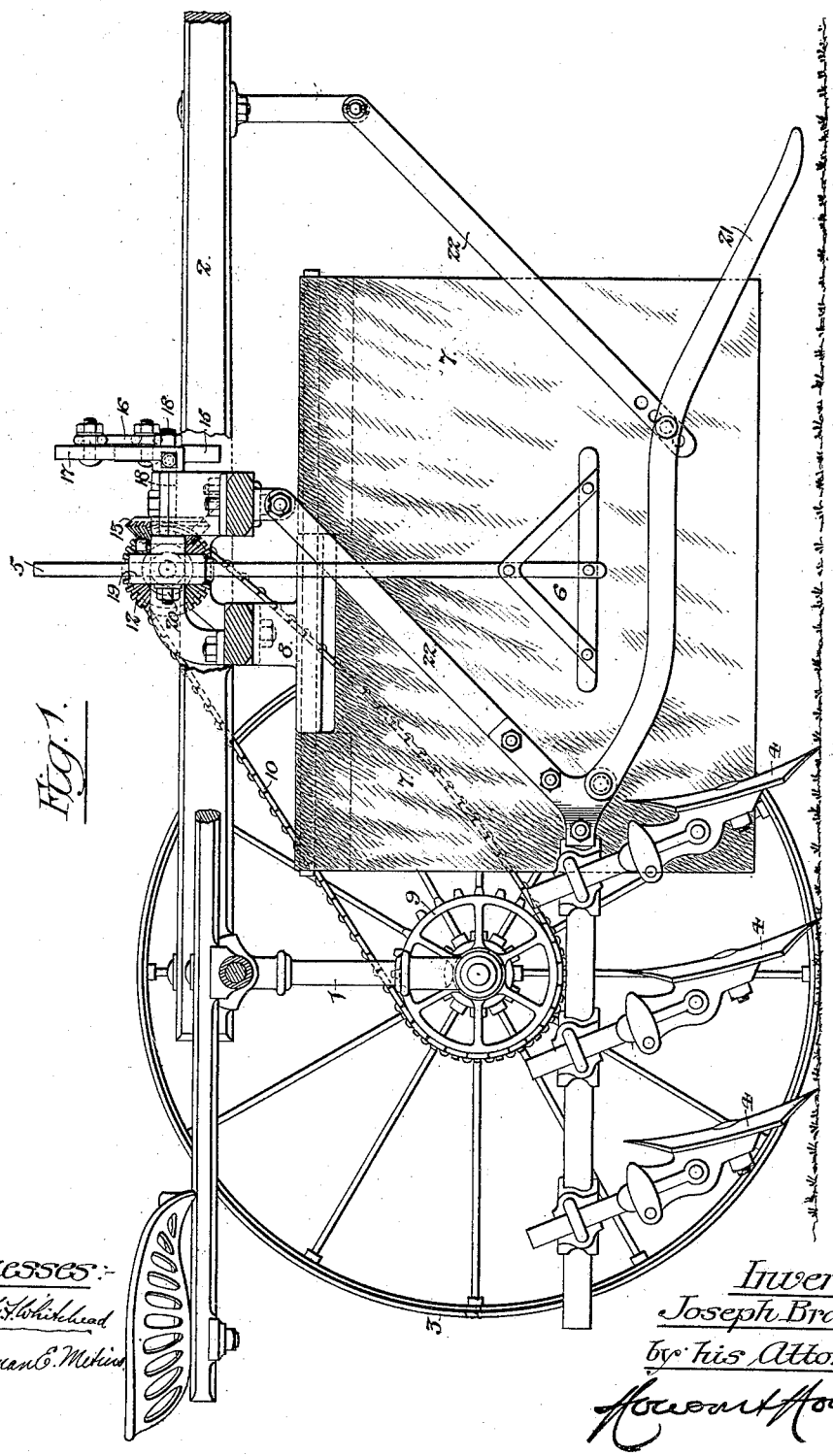
Figure 2:
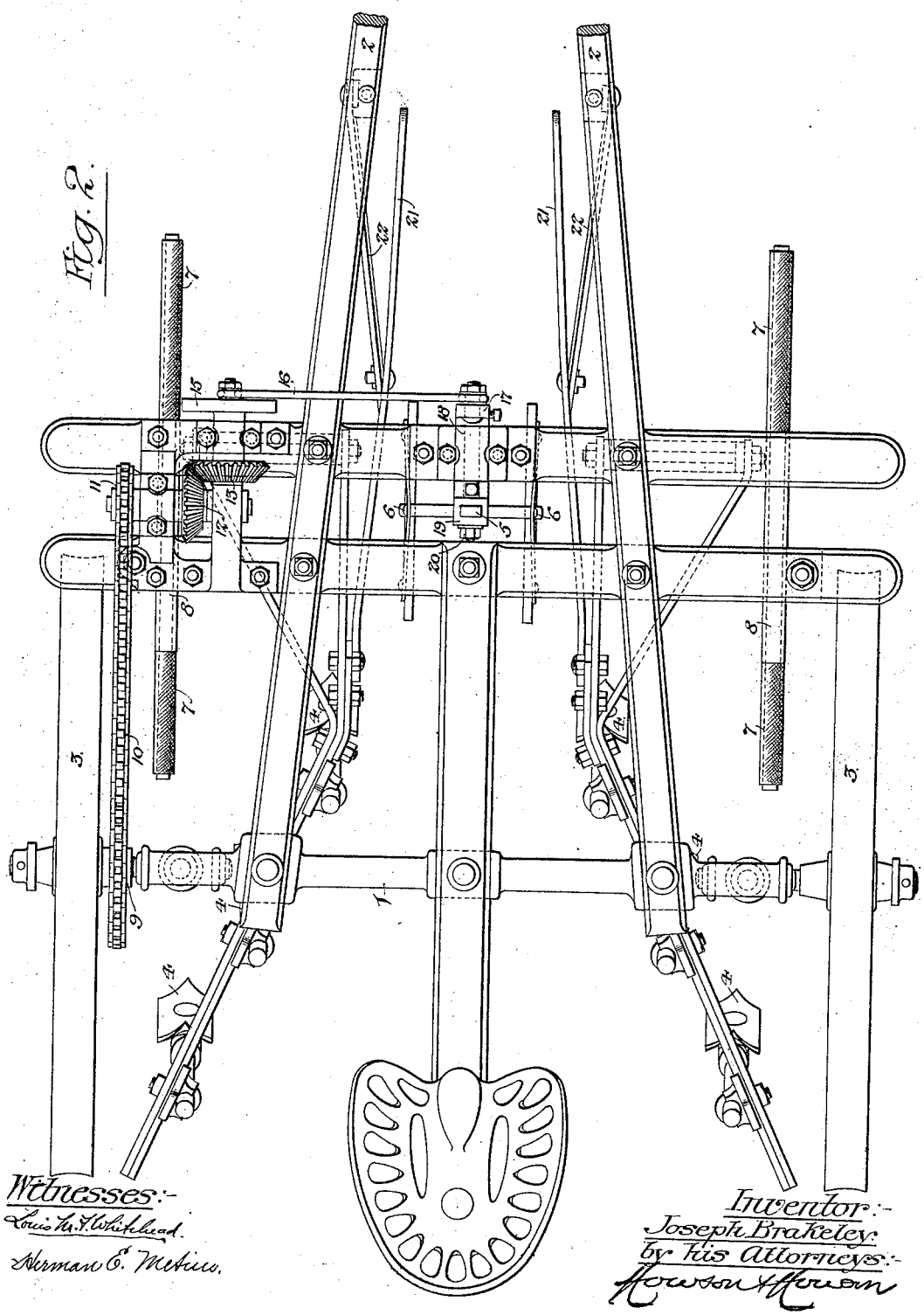
Figure 3:
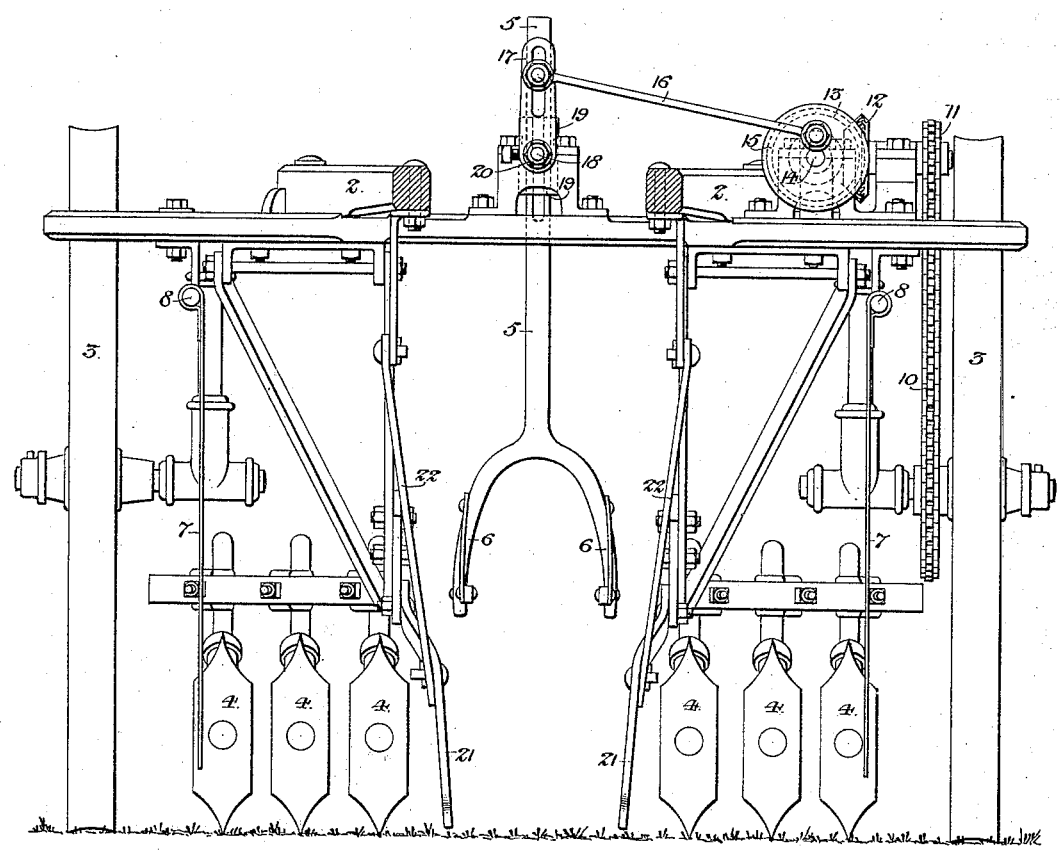

Figure 1 is a longitudinal sectional view of sufficient of an ordinary cultivator to illustrate the application thereto of the means whereby I effect the removal of the insect parasites from the vines or plants. Fig. 2 is a plan view of the machine, and Fig. 3 is a transverse section of the same.

I have shown my invention as applied to an ordinary form of cultivator, of which 1 represents the arched frame; 2, the projecting pole; 3, the supporting-wheels, and 4 the gangs of cultivator-blades; but my invention can be embodied in a special machine, if desired, instead of being supplemental to an ordinary cultivator, such special machine being provided with furrow-turners or being, if not so provided, driven along the row ahead of a cultivator.

The device employed for effecting the removal of the insect parasites from the vines or plants is a transversely-swinging beater 5, preferably forked at its lower end in order to have a double beating action when swung in either direction, the depending portion of each leg 6 of the beater being provided with a bar, brush, or other device for acting upon the vines or plants as the beater is vibrated in such manner that said vines or plants will be shaken or agitated and the insect parasites dislodged therefrom and caused to fall to the ground on each side of the row, the furrowing or earth-turning teeth or blades of the machine immediately following the action of the beater and killing the dislodged parasites by burying them before they have an opportunity to crawl back upon the vines or plants.

In order to confine the dislodged insects within the path of the following teeth or blades and prevent them from being thrown from one row of plants onto a row on either side of the same, I employ depending shields or aprons 7, which may be of any suitable material—such as sheet-iron, canvas, rubber-coated fabric, or the like—these shields or aprons 7 depending from a suitable supporting-frame 8, mounted upon the elevated frame of the machine.

The means adopted for effecting the vibration of the beater-bar 5 are as follows: On the hub of one of the supporting-wheels 3 of the machine is a sprocket-wheel 9, which receives a chain 10, the latter being also adapted to a sprocket-wheel 11, which is free to turn on a stud on the fixed frame of the machine and has formed with or secured to it a bevel-wheel 12, which drives a bevel-pinion 13 on a short shaft 14, mounted in a bearing on the frame and having a crank-disk 15, the crank-pin of the latter being connected by a rod 16 to an arm 17 on a rock-shaft 18, likewise adapted to a suitable bearing on the fixed frame of the machine and having a slotted head 19 for the reception of the beater-bar 5, the latter being vertically adjustable in said head and being secured after adjustment by means of a set-screw 20 in order that the beaters may be vertically adjusted to suit the height of the growing vines or plants being acted upon. Any desired means, however, may be used for imparting vibrating movement to the beater-bar, and instead of using a single forked bar, as shown and described, two independent bars may be used, one on each side of the row, a single forked bar being preferred as the cheaper and more convenient form. On the other hand, a single beater only may be employed, and if such beater acts upon the plants from but one side one of the guards or shields 7 may also be dispensed with.

In order to lift the fallen plants or vines into the path of the beater, I employ lifter-bars 21, inclined at their forward ends, so as to run under and raise the fallen vines, said lifter-bars being supported by pivoted arms 22 and by the frames which carry the cultivator blades or teeth, so as to be lifted out of action simultaneously with said blades or teeth.

Having thus described my invention, I claim and desire to secure by Letters Patent—

1. The combination, in a machine for removing insect parasites from vines or plants, of a supporting-frame, a vibrating beater, means for vibrating the latter, and furrowing blades or teeth following the action of the beater, and serving to bury the insects shaken from the vines or plants by said beater.

2. The combination, in a machine for removing insect parasites from vines or plants, of a supporting-frame, a vibrating beater-bar forked at the lower end so as to carry a pair of beaters, and means for vibrating said beater-bar.

3. The combination in a machine for removing insect parasites from vines or plants, of a supporting-frame, a vibrating beater, means for vibrating the same, and lifters comprising bars inclined downwardly at their forward ends, terminating near the ground and having elevated portions in the rear of said downwardly-inclined portions whereby said lifters are adapted to run under and raise from the ground fallen plants or vines, thereby supporting the same in the path of the beater, substantially as described.

4. The combination, in a machine for removing insect parasites from vines or plants, of a supporting-frame, a vibrating beater, means for vibrating the same, lifters for raising fallen plants or vines into the path of the beater, furrowing-blades following the action of the beater, and means for hanging said blades and lifters, whereby they can be raised and lowered.

In testimony whereof I have signed my name to this specification in the presence of two subscribing witnesses.

JOSEPH BRAKELEY.

Witnesses:
F. E. BECHTOLD,
JOS. H. KLEIN.